United States Patent [19]

Basile, deceased et al.

[11] 4,068,280
[45] Jan. 10, 1978

[54] AUTOMATIC CIRCUIT RESTORATION DEVICE FOR POLYPHASE FEED LINES

[76] Inventors: Pietro Basile, deceased, late of San Giovanni in Fiore (Cosenza), Italy; Maria Caligiuri, administrator, Via Gramsci 146, San Giovanni in Fiore (Cosenza), Italy

[21] Appl. No.: 687,042

[22] Filed: May 17, 1976

[51] Int. Cl.² ............................................... H02H 3/24
[52] U.S. Cl. ........................................ 361/92; 361/86; 335/20
[58] Field of Search ................... 317/46, 47, 48, 31; 335/7, 14, 20; 361/92, 93, 88, 90, 76, 86

[56] References Cited

U.S. PATENT DOCUMENTS

| 1,314,332 | 8/1919 | Jones | 317/46 |
| 1,800,256 | 4/1931 | Keller | 317/46 |
| 1,809,827 | 6/1931 | Bower | 317/46 |
| 3,546,531 | 12/1970 | Miner | 317/46 X |
| 3,922,624 | 11/1975 | Basile | 317/46 X |

*Primary Examiner*—J D Miller
*Assistant Examiner*—Patrick R. Salce
*Attorney, Agent, or Firm*—Bucknam and Archer

[57] ABSTRACT

An automatic circuit restoration device for polyphase lines, comprising a set of normally open circuit breakers connected in series to respective feed lines and controlled in unison by one coil, and an auxiliary movable contact controlled by means responsive to the presence of voltage on one or more of the feed lines so that said movable contact is opened and said circuit breakers are closed through said coil when one of said feed lines is deenergized.

1 Claim, 1 Drawing Figure

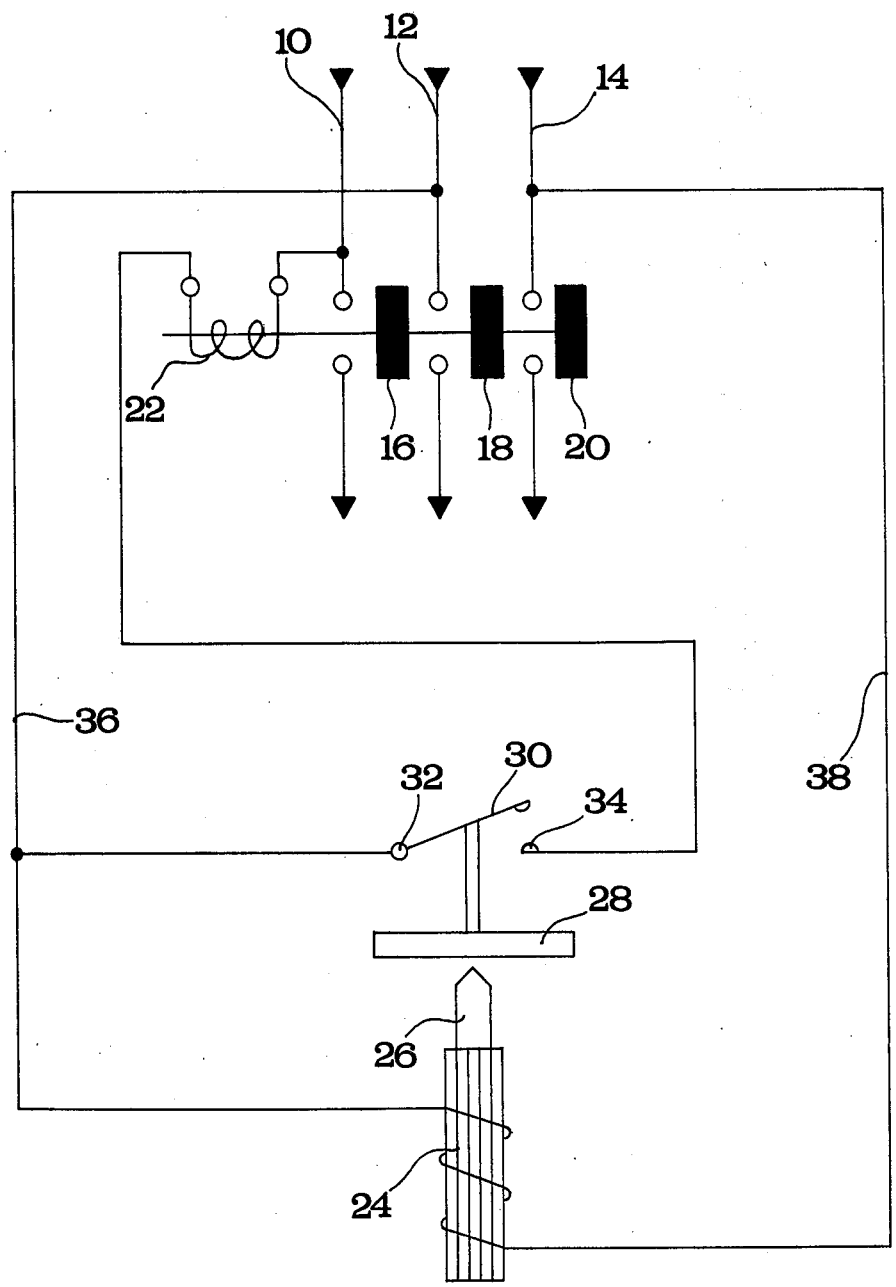

AUTOMATIC CIRCUIT RESTORATION DEVICE FOR POLYPHASE FEED LINES

This invention relates to an automatic circuit restoration device that can be used for polyphase feed lines to open a set of circuit breakers in case of failure of one of the phases and for automatically restoring the circuit breakers to the closed position only when all phases are alive again.

U.S. Pat. No. 3,922,624 to Pietro BASILE discloses an automatic circuit restoring device for polyphase lines which, however, requires for its operation the provision of a neutral line and uses two separate relays.

It is the object of the present invention to overcome the limitations of this prior circuit restoration device by providing an automatic circuit restoration device for polyphase lines, capable of operation without the provision of a neutral line and having a more simple structure and consequently being less expensive to produce than the device described in the above patent.

This object is achieved according to the invention by an automatic circuit restoration device for polyphase lines, including a plurality of feed lines, a set of normally open circuit breakers connected in series to the respective feed lines and controlled by one coil, and an auxiliary movable contact controlled by means responsive to the presence of voltage on one or more of the feed lines, characterized in that said coil for controlling the set of circuit breakers and said auxiliary contact are connected in series between a first and a second one of said plurality of feed lines and said voltage responsive means includes one or more coils having a movable core and corresponding in number to the number of feed lines minus two, with the terminals of each coil connected between the respective pairs of feed lines except the first one, said movable cores being adapted to maintain in a first position a movable plate that keeps said movable contact open, said movable cores retracting when said coils are energized to permit said movable plate to move to a second position for closing said movable contact.

A preferred embodiment of the invention will now be described by way of example and with reference to the accompanying drawing in which the single FIGURE shows a circuit diagram of the automatic circuit restoration device according to the invention.

Referring to the drawing, there is shown a three-phase alternating current feed system comprising three lines 10, 12, 14 and a set of circuit breakers or switches 16, 18, 20 controlled by a coil 22 for interrupting the lines.

The automatic circuit restoration device according to the invention comprises a solenoid having a winding 24 and a movable core 26 which, as seen in the drawing, extends upwardly when the winding is deenergized and is pulled downwardly by energization of the winding. Arranged above the core 26 is a movable plate 28 connected to a movable contact 30 adapted to establish and interrupt a connection between two poles 32, 34. As long as the winding 24 is deenergized, the core 26 keeps the movable plate 28 in the upper position and the plate 28 keeps the contact 30 open. However, when the core 26 is attracted by the winding 24, the movable plate 28 drops down under its own weight to close the contact 30.

The opposite ends of the winding 24 are connected through conductors 36, 38 to respective phase lines such as 12, 14, of the three-phase system so that the coil 24 will be energized only when both phases are present on the respective lines 12 and 14, but will be deenergized when one or both of these phases fail.

The pole 32 of the two poles associated with the movable contact 30 is connected through a conductor 36 to the phase line 12 while the other pole 34 is connected to one end of the winding 22 which controls the set of circuit breakers 16, 18, 20. The opposed end of the winding 22 is connected to the third phase line 10.

It will thus be seen that when both phase lines 12 and 14 are energized, the contact 30 will be closed, but this contact will be open when one or both of these phase lines are deenergized as for energization of the winding 22 it is necessary that both phase lines 12 and 14 are energized. But it is also necessary that the phase line 10 should be energized. Failure of one of the three phases will always result in deenergization of the winding 22 and opening of the switches 16, 18, 20 either due to opening of the contact 30 or due to lack of energization at the end of the winding 22 connected to the line 10.

The principle of operation of the described device may also be extended to lines having more than three phases, say six phases, by adding an additional winding with movable core for each phase added to the first three ones. In this manner a set of windings with movable core similar to the winding 24 will be obtained and all these windings will be arranged to cooperate with the movable plate 28 so that it will be sufficient for one of the cores to be in the extended position to keep the plate 28 in the elevated position and the contact 30 open. It will be evident that also in this case all the phase lines must be energized to produce energizaton of the winding 22 to close the set of circuit breakers.

Although a preferred embodiment of the invention has been described herein in detail and illustrated in the accompanying drawing, it will be evident to those skilled in the art that numerous changes and modifications may be made therein without departing from the scope of the invention as defined by the appended claims.

I claim:

1. An automatic circuit breaker apparatus for polyphase electric systems having a plurality of feed lines associated with respective electric phases, which apparatus comprises a set of normally open main switching contacts connected in series to the respective feed lines and controlled in unison by one coil, and an auxiliary set of switching contacts controlled by means of responsive to the presence of voltage on one or more of the feed lines, said coil for controlling the set of main switching contacts, and said auxiliary switching contacts being connected in series between a first and a second one of said plurality of feed lines, said voltage responsive means including a coil having a movable core, with the terminals of said voltage responsive means coil being connected between one of said first and second feed lines and a third feed line, said movable core being adapted to maintain in a first position a movable plate that keeps said auxilliary set of switching contacts open said movable core retracting when said coil of voltage responsive means is energized to permit said movable plate to move by gravity to a second position for closing said auxiliary set of switching contacts.

* * * * *